(12) United States Patent
Shaieb et al.

(10) Patent No.: US 12,326,941 B2
(45) Date of Patent: Jun. 10, 2025

(54) DYNAMIC PRIORITIZATION OF VULNERABILITY EXCLUSION RENEWALS

(71) Applicant: International Business Machines Corporation, Armonk, NY (US)

(72) Inventors: Johnny Al Shaieb, Cypress, TX (US); Michael Redford, Wentzville, MO (US); Jason A. Nikolai, Rochester, MN (US); Jason Bornheimer, Spring, TX (US); Steven Ocepek, Cuyahoga Falls, OH (US); Robert Maier, Milliken, CO (US); Christopher Bedell, Brooklyn, NY (US); Seth Grey Glasgow, Akron, OH (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 17/567,925

(22) Filed: Jan. 4, 2022

(65) Prior Publication Data
US 2023/0214495 A1  Jul. 6, 2023

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| 7,647,622 B1* | 1/2010 | Sobel | H04L 63/1425 709/229 |
| 8,141,155 B2* | 3/2012 | Jeschke | H04L 63/1433 713/161 |

(Continued)

FOREIGN PATENT DOCUMENTS

| CN | 102799822 B | 6/2015 |
| CN | 107194259 B | 6/2019 |

(Continued)

OTHER PUBLICATIONS

"Exclusions (Classic Interface)", Tenable.io, last updated Oct. 8, 2021, 8 pages, <https://docs.tenable.com/tenableio/vulnerabilitymanagement/Content/Scans/Classic/Exclusions.htm>.

(Continued)

*Primary Examiner* — Dant B Shaifer Harriman
*Assistant Examiner* — Mahabub S Ahmed
(74) *Attorney, Agent, or Firm* — Daniel M. Yeates

(57) ABSTRACT

A computer-implemented method for prioritizing exclusion renewal records is disclosed. The computer-implemented method includes determining vulnerability factors associated with a vulnerability exclusion record. The computer-implemented method further includes generating a vulnerability factor score for each vulnerability factor associated with the vulnerability exclusion record based, at least in part, on a level of risk associated with the vulnerability factor. The computer-implemented method further includes generating a vulnerability score for the vulnerability exclusion record based, at least in part, on the vulnerability factor score for each vulnerability factor. The computer-implemented method further includes updating a previous vulnerability score of the vulnerability exclusion record.

17 Claims, 6 Drawing Sheets

(56) References Cited

U.S. PATENT DOCUMENTS

| | | | | |
|---|---|---|---|---|
| 8,515,783 | B1* | 8/2013 | Weeks | G06Q 10/0635 |
| | | | | 705/4 |
| 8,739,290 | B1* | 5/2014 | Jamail | G06F 11/0709 |
| | | | | 726/25 |
| 9,148,441 | B1* | 9/2015 | Tamersoy | G06F 21/566 |
| 9,692,778 | B1* | 6/2017 | Mohanty | G06F 9/45533 |
| 10,382,473 | B1* | 8/2019 | Ashkenazy | H04L 63/1466 |
| 10,534,918 | B1* | 1/2020 | Davidi | G06F 21/577 |
| 10,994,198 | B1* | 5/2021 | Byskal | G06F 9/50 |
| 11,070,496 | B1* | 7/2021 | Rae | G06F 8/71 |
| 11,082,442 | B1* | 8/2021 | Kolman | H04L 63/08 |
| 11,296,971 | B1* | 4/2022 | Jain | H04L 43/04 |
| 11,637,869 | B2* | 4/2023 | Crabtree | H04L 63/1425 |
| | | | | 726/22 |
| 11,704,431 | B2* | 7/2023 | Kraus | H04L 63/0414 |
| | | | | 726/26 |
| 11,757,907 | B1* | 9/2023 | Berger | G06N 7/01 |
| | | | | 726/23 |
| 11,757,916 | B1* | 9/2023 | Woolgar-O'Neil | |
| | | | | G06Q 10/0635 |
| 2002/0169658 | A1* | 11/2002 | Adler | G06Q 10/06 |
| | | | | 705/7.29 |
| 2002/0199122 | A1* | 12/2002 | Davis | G06F 21/577 |
| | | | | 726/25 |
| 2006/0277539 | A1* | 12/2006 | Amarasinghe | G06F 21/54 |
| | | | | 717/168 |
| 2007/0050239 | A1* | 3/2007 | Caneva | G06Q 10/06398 |
| | | | | 705/7.41 |
| 2007/0094735 | A1* | 4/2007 | Cohen | H04L 63/168 |
| | | | | 713/188 |
| 2010/0153156 | A1* | 6/2010 | Guinta | G06Q 10/0635 |
| | | | | 706/54 |
| 2010/0191952 | A1* | 7/2010 | Keinan | G06Q 10/06 |
| | | | | 713/100 |
| 2010/0242114 | A1* | 9/2010 | Bunker | G06F 21/577 |
| | | | | 709/224 |
| 2011/0055852 | A1* | 3/2011 | Smith | G06Q 40/08 |
| | | | | 719/318 |
| 2013/0085917 | A1* | 4/2013 | Agarwal | G06Q 40/06 |
| | | | | 705/35 |
| 2013/0167238 | A1* | 6/2013 | Russell | H04L 63/1433 |
| | | | | 726/25 |
| 2014/0013434 | A1* | 1/2014 | Ranum | G06F 21/564 |
| | | | | 726/24 |
| 2014/0173737 | A1* | 6/2014 | Toback | G06F 21/57 |
| | | | | 726/25 |
| 2014/0201843 | A1* | 7/2014 | Hibbert | H04L 63/1433 |
| | | | | 726/25 |
| 2014/0245376 | A1* | 8/2014 | Hibbert | G06F 21/577 |
| | | | | 726/1 |
| 2015/0026027 | A1* | 1/2015 | Priess | G06Q 10/04 |
| | | | | 705/35 |
| 2016/0057164 | A1* | 2/2016 | Maeng | H04L 63/10 |
| | | | | 726/25 |
| 2016/0300252 | A1* | 10/2016 | Frank | G06F 21/6245 |
| 2017/0147338 | A1* | 5/2017 | Jackson | G06F 8/71 |
| 2017/0277887 | A1* | 9/2017 | Ijiro | G06F 21/554 |
| 2018/0004948 | A1* | 1/2018 | Martin | H04L 63/1425 |
| 2018/0241721 | A1* | 8/2018 | Harvey | H04L 63/0227 |
| 2018/0336353 | A1* | 11/2018 | Manadhata | G06F 16/3334 |
| 2019/0005246 | A1* | 1/2019 | Cherny | G06F 21/577 |
| 2019/0081967 | A1* | 3/2019 | Balabine | H04L 63/1425 |
| 2019/0104156 | A1* | 4/2019 | Barkovic | G06F 11/3006 |
| 2019/0166149 | A1* | 5/2019 | Gerrick | G06F 21/577 |
| 2019/0188616 | A1* | 6/2019 | Urban | G06Q 10/0875 |
| 2019/0205545 | A1* | 7/2019 | Boutnaru | G06F 21/52 |
| 2019/0245881 | A1* | 8/2019 | Ward | H04L 63/1433 |
| 2019/0288915 | A1* | 9/2019 | Denyer | H04L 41/12 |
| 2020/0050770 | A1* | 2/2020 | Inagaki | G06F 21/577 |
| 2020/0120126 | A1* | 4/2020 | Ocepek | H04L 63/1433 |
| 2020/0162497 | A1* | 5/2020 | Iyer | H04L 63/164 |
| 2020/0162498 | A1* | 5/2020 | Ababtain | H04L 63/1416 |
| 2020/0162499 | A1* | 5/2020 | Alsharif | G06F 21/577 |
| 2020/0242566 | A1* | 7/2020 | Agarwal | G06N 7/01 |
| 2020/0274894 | A1* | 8/2020 | Argoeti | H04L 63/1433 |
| 2020/0314135 | A1* | 10/2020 | Kang | H04L 63/1433 |
| 2020/0344256 | A1* | 10/2020 | Alabdulhadi | H04L 63/1416 |
| 2020/0382547 | A1* | 12/2020 | Basballe Sorensen | |
| | | | | H04L 63/1433 |
| 2020/0389482 | A1* | 12/2020 | Engle | H04L 63/20 |
| 2020/0412758 | A1* | 12/2020 | Trivellato | G06F 21/577 |
| 2021/0019423 | A1* | 1/2021 | DuBois | G06F 21/552 |
| 2021/0152589 | A1* | 5/2021 | Waplington | G06F 16/2282 |
| 2021/0173935 | A1* | 6/2021 | Ramasamy | G06F 21/577 |
| 2021/0182920 | A1* | 6/2021 | Anderson | G06Q 10/02 |
| 2021/0211450 | A1* | 7/2021 | Aleidan | H04L 63/1416 |
| 2021/0312058 | A1* | 10/2021 | Chiarelli | G06Q 10/067 |
| 2021/0329024 | A1* | 10/2021 | Mauro | G06F 21/577 |
| 2021/0374754 | A1* | 12/2021 | Pandian | G06N 3/08 |
| 2022/0012340 | A1* | 1/2022 | Rao | H04L 63/1433 |
| 2022/0109689 | A1* | 4/2022 | Hamdi | G06Q 10/0635 |
| 2022/0150271 | A1* | 5/2022 | Shah | H04L 63/1433 |
| 2022/0156383 | A1* | 5/2022 | Schwarzbauer | G06F 21/54 |
| 2022/0159033 | A1* | 5/2022 | Mizrahi | H04L 63/1441 |
| 2022/0210200 | A1* | 6/2022 | Crabtree | G06F 16/951 |
| 2022/0215100 | A1* | 7/2022 | Waplington | G06F 21/577 |
| 2022/0263843 | A1* | 8/2022 | Aslam | H04L 43/045 |
| 2022/0337611 | A1* | 10/2022 | Brazao | G16Y 20/20 |
| 2023/0072258 | A1* | 3/2023 | Inagaki | G06F 16/252 |
| 2023/0109926 | A1* | 4/2023 | Nair | G06F 21/567 |
| | | | | 726/25 |
| 2023/0110056 | A1* | 4/2023 | Gullikson | G05B 23/0283 |
| | | | | 700/80 |
| 2023/0114821 | A1* | 4/2023 | Thomas | H04L 63/20 |
| | | | | 726/23 |
| 2023/0120174 | A1* | 4/2023 | Seck | G06F 21/566 |
| | | | | 726/25 |
| 2023/0153443 | A1* | 5/2023 | Coppins | G06F 21/6245 |
| | | | | 726/25 |
| 2023/0177167 | A1* | 6/2023 | Chan | H04L 63/10 |
| | | | | 726/1 |
| 2023/0185921 | A1* | 6/2023 | Karas | G06F 21/577 |
| | | | | 726/25 |
| 2023/0214246 | A1* | 7/2023 | Darji | G06F 9/5077 |
| | | | | 718/1 |

FOREIGN PATENT DOCUMENTS

| | | |
|---|---|---|
| CN | 110704848 A | 1/2020 |
| CN | 110808947 A | 2/2020 |
| WO | 201234304 A1 | 3/2012 |

OTHER PUBLICATIONS

"Manage Your Excluded Hosts", downloaded from the Internet on Oct. 11, 2021, 2 pages, <https://qualysguard.qualys.com/qwebhelp/fo_portal/host_assets/win_edit_excluded_hosts.htm>.

"National Vulnerability Database", Information Technology Laboratory, CVE-2014-6271 Detail, last modified Feb. 1, 2021, 12 pages, <https://nvd.nist.gov/vuln/detail/CVE-2014-6271#VulnChangeHistorySection>.

"Shellshock Vulnerability", Tudor Enache, OWASP, downloaded from the Internet on Oct. 11, 2021, 25 pages, <https://owasp.org/www-pdf-archive/Shellshock_-_Tudor_Enache.pdf>.

"Vulnerability exceptions", Rapid 7, downloaded from the internet on Oct. 11, 2021, <https://docs.rapid7.com/insightvm/working-with-vulnerability-exceptions/>, 21 pages.

"Vulnerability Scanning Exclusions", ARMOR, downloaded from the Internet on Oct. 11, 2021, 3 pages, <https://docs.armor.com/display/KBSS/Vulnerability+Scanning+Exclusions>.

Mell et al., "The NIST Definition of Cloud Computing", Recommendations of the National Institute of Standards and Technology, NIST Special Publication 800-145, Sep. 2011, 7 pages.

Tegg, Joe, "Vulnerability Management Technique: Managing Asset Exclusion to Avoid Blind Spots", Sep. 9, 2016, Rapid 7, <https://

(56) References Cited

OTHER PUBLICATIONS www.rapid7.com/blog/post/2016/09/09/managing-asset-exclusion-avoiding-blind-spots/>, 13 pages.

\* cited by examiner

DYNAMIC PRIORITIZATION OF VULNERABILITY EXCLUSION RENEWALS

BACKGROUND

The present invention relates generally to the field of vulnerability exclusion renewals, and more particularly to, dynamically prioritizing vulnerability exclusion renewals.

Vulnerabilities can include a weakness or flaw that can allow an unauthorized computer or threat actor to gain access to a network's sensitive data and perform unauthorized actions. Exclusion records for renewal include a list of vulnerabilities. Vulnerabilities detected, that are in scope to be excluded, can either be classified as a (i) false positive, (ii) mitigated risk, or (iii) accepted risk. False positives are vulnerabilities that a scanner reports as positive against a device or application, but upon inspection the vulnerability does not exist. Mitigated risks are unofficial temporary solutions used as countermeasures to prevent the vulnerability from being exploited. Countermeasures can include firewalls, registry edits, configuration changes and more. Accepted risks exclusions are created when the client acknowledges the positive existence of a vulnerability and requests for that vulnerability to be removed due to accepting the risk. Clients request "Accepted Risks" for various reasons, which include but are not limited to end-of-life operating systems and applications, SSL/TLS upgrade limitations, system criticality, and remediation sensitivity, or the vulnerability poses a low risk.

When an exclusion record is approved, open vulnerabilities downstream are excluded for a mediation team to fix. When an exclusion record is denied, the vulnerability is put back into the queue for a mediation team to fix. Typically excluded vulnerability records go through at least a yearly renewal process depending on the industry standard or risk posture. The renewal process evaluates each exclusion record to determine if the particular vulnerability record should remain excluded.

SUMMARY

According to one embodiment of the present invention, a computer-implemented method for prioritizing exclusion renewal records is disclosed. The computer-implemented method includes determining vulnerability factors associated with a vulnerability exclusion record. The computer-implemented method further includes generating a vulnerability factor score for each vulnerability factor associated with the vulnerability exclusion record based, at least in part, on a level of risk associated with the vulnerability factor. The computer-implemented method further includes generating a vulnerability score for the vulnerability exclusion record based, at least in part, on the vulnerability factor score for each vulnerability factor. The computer-implemented method further includes updating a previous vulnerability score of the vulnerability exclusion record.

According to another embodiment of the present invention, a computer program product for prioritizing exclusion renewal records is disclosed. The computer program product includes one or more computer readable storage media and program instructions stored on the one or more computer readable storage media. The program instructions include instructions to determine vulnerability factors associated with a vulnerability exclusion record. The program instructions further include instructions to generate a vulnerability factor score for each vulnerability factor associated with the vulnerability exclusion record based, at least in part, on a level of risk associated with the vulnerability factor. The program instructions further include instructions to generate a vulnerability score for the vulnerability exclusion record based, at least in part, on the vulnerability factor score for each vulnerability factor. The program instructions further include instructions to update a previous vulnerability score of the vulnerability exclusion record.

According to another embodiment of the present invention, a computer system for prioritizing exclusion renewal records is disclosed. The computer system includes one or more computer processors, one or more computer readable storage media, and computer program instructions, the computer program instructions being stored on the one or more computer readable storage media for execution by the one or more computer processors. The program instructions include instructions to determine vulnerability factors associated with a vulnerability exclusion record. The program instructions further include instructions to generate a vulnerability factor score for each vulnerability factor associated with the vulnerability exclusion record based, at least in part, on a level of risk associated with the vulnerability factor. The program instructions further include instructions to generate a vulnerability score for the vulnerability exclusion record based, at least in part, on the vulnerability factor score for each vulnerability factor. The program instructions further include instructions to update a previous vulnerability score of the vulnerability exclusion record.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
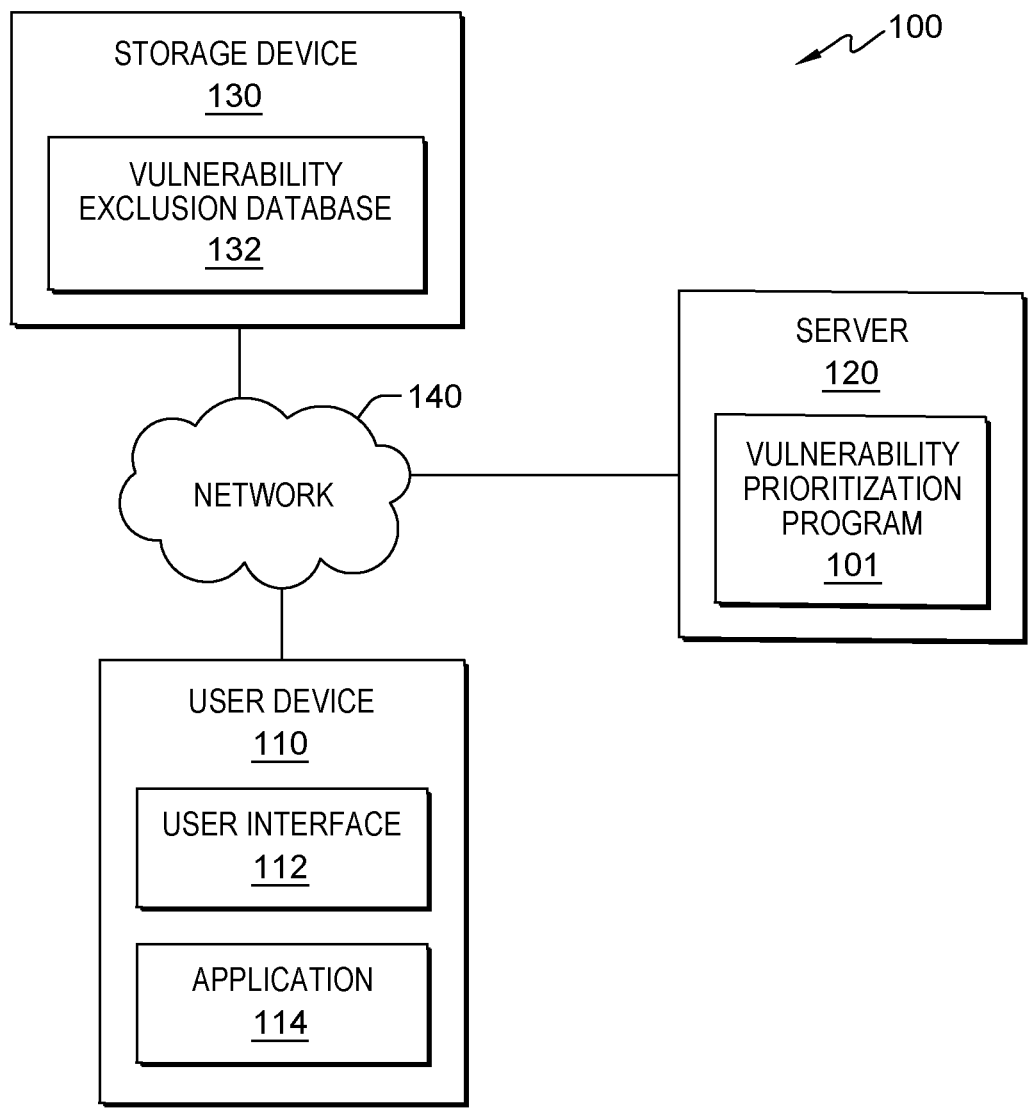
FIG. 1 is a functional block diagram of a network computing environment suitable for a vulnerability prioritization program 101, generally designated 100, in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of vulnerability exclusion renewals, and more particularly to, dynamically prioritizing vulnerability exclusion renewals.

The reviewal of exclusion record for renewals is often forgotten about and is becoming more of problem as new vulnerabilities and exploits enter the network. In some cases, exclusions that are tied to specific machines and or specific vulnerabilities are often exploited because those exclusion records are not reviewed. Typically, not all vulnerabilities can be fixed or upgraded, such as the encryption level is too high. In these cases, an exclusion or exception record is created for the particular vulnerability. For example, a firewall is utilized to accept or mitigate the risk. Over time, vulnerabilities which are detected can mature. As the number of excluded vulnerability records increases, it becomes a daunting and unrealistic task to evaluate each record per renewal cycle. Currently, vulnerability scan tools do not provide a risk awareness score for a particular exclusion or identify how often vulnerability exclusions should be renewed and in what priority they should be renewed. Moreover, as new attacks are made publicly available, exclusions should be continuously re-evaluated. Typically, excluded records are evaluated on a yearly basis. However, it is extremely difficult to review all excluded vulnerabilities records in a year's time as excluded records grow.

Embodiments of the present invention recognize many factors affect the priority of a vulnerability. Embodiments of the present invention determine and evaluate the exclusion type, system criticality, vulnerability anatomy, remediation sensitivity, network domicile, past renewal decisions, and machine learning to prioritize the most critical excluded records to be addressed. Embodiments of the present invention recognize different factors have different weight to the priority of a vulnerability. For example, one factor may have a significantly higher vulnerability than another factor. Embodiments of the present invention generate a prioritization score in order to detect high priority vulnerabilities associated with exclusion records. Embodiments of the present invention determine which vulnerability exclusion records should be reviewed first according to risk urgency. Embodiments of the present invention generate a feedback loop for governance teams whereby bringing awareness to vulnerability exclusion records that should be reviewed.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram of a network computing environment suitable for a vulnerability prioritization program 101, generally designated 100, in accordance with at least one embodiment of the present invention. In an embodiment, network computing environment 100 may be provided by cloud computing environment 50, as depicted and described with reference to FIG. 5, in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110, server 120, and storage device 130 interconnected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In an embodiment, multiple user devices are interconnected over network 140. In general, user device 110 can represent any programmable electronic device or combination of programmable electronic devices capable of executing machine readable program instructions and communicating with server 120, storage device 130 and other devices (not depicted) via a network, such as network 140. User device 110 can include internal and external hardware components, as depicted and described in further detail with respect to FIG. 4.

User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API). In an embodiment, user interface 112 is utilized to display information related to one or more exclusion records, prioritization scores, or other exclusion information.

Application 114 can be representative of one or more applications (e.g., an application suite) that operate on user device 110. In an embodiment, application 114 is representative of one or more applications (e.g., exclusion records, vulnerability detection applications, etc.) located on user device 110. In various example embodiments, application 114 can be an application that a user of user device 110 utilizes to visualize the one or more vulnerabilities detected or vulnerability prioritization scores determined by vulnerability prioritization program 101. In an embodiment, application 114 can be a client-side application associated with a server-side application running on server 120 (e.g., a client-side application associated with vulnerability prioritization program 101). In an embodiment, application 114 can operate to perform processing steps of vulnerability prioritization program 101 (i.e., application 114 can be representative of vulnerability prioritization program 101 operating on user device 110).

Server 120 is configured to provide resources to various computing devices, such as user device 110. In various embodiments, server 120 is a computing device that can be a standalone device, a management server, a web server, an application server, a mobile device, or any other electronic device or computing system capable of receiving, sending, and processing data. In an embodiment, server 120 represents a server computing system utilizing multiple computers as a server system, such as in a cloud computing environment. In an embodiment, server 120 represents a computing system utilizing clustered computers and components (e.g., database server computer, application server computer, web server computer, webmail server computer, media server computer, etc.) that act as a single pool of seamless resources when accessed within network computing environment 100. In general, server 120 represents any programmable electronic device or combination of programmable electronic devices capable of executing machine readable program instructions and communicating with each other, as well as with user device 110, storage device 130, and other computing devices (not shown) within network computing environment 100 via a network, such as network 140.

In an embodiment, server 120 includes vulnerability prioritization program 101. In an embodiment, vulnerability prioritization program 101 may be configured to access various data sources, such as the vulnerability exclusion database that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, vulnerability prioritization program 101 enables the authorized and secure processing of personal data. In an embodiment, vulnerability prioritization program 101 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, vulnerability prioritization program 101 provides information regarding personal data and the nature (e.g., type, scope, purpose, duration, etc.) of the processing. In an embodiment, vulnerability prioritization program 101 provides a user with copies of stored personal data. In an embodiment, vulnerability prioritization program 101 allows for the correction or completion of incorrect or incomplete personal data. In an embodiment, vulnerability prioritization program 101 allows for the immediate deletion of personal data.

Figure 4:
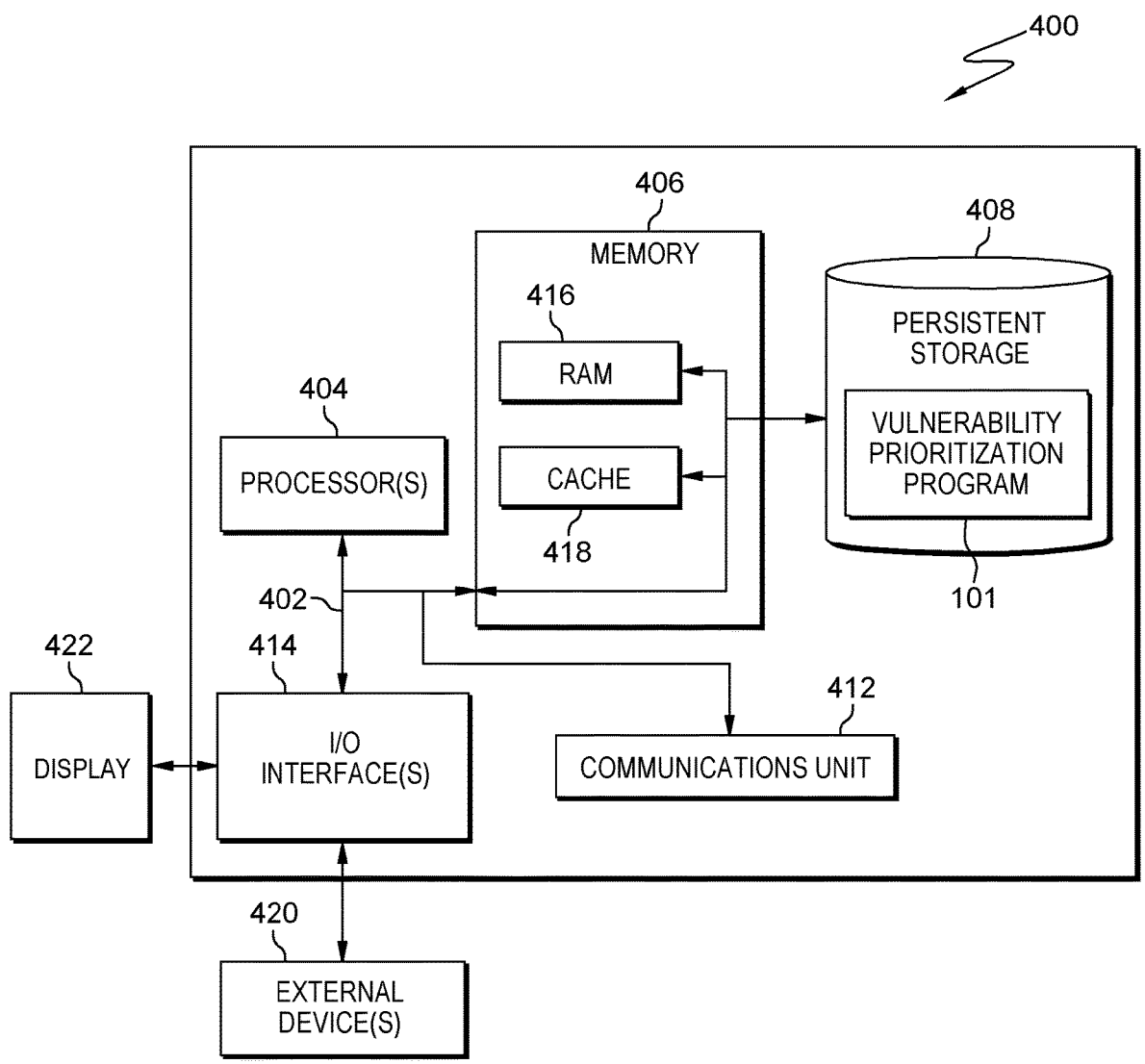
FIG. 4 is a block diagram depicting components of a computer, generally designated 400, suitable for executing a vulnerability prioritization program 101 in accordance with at least one embodiment of the present invention.
Figure 5:
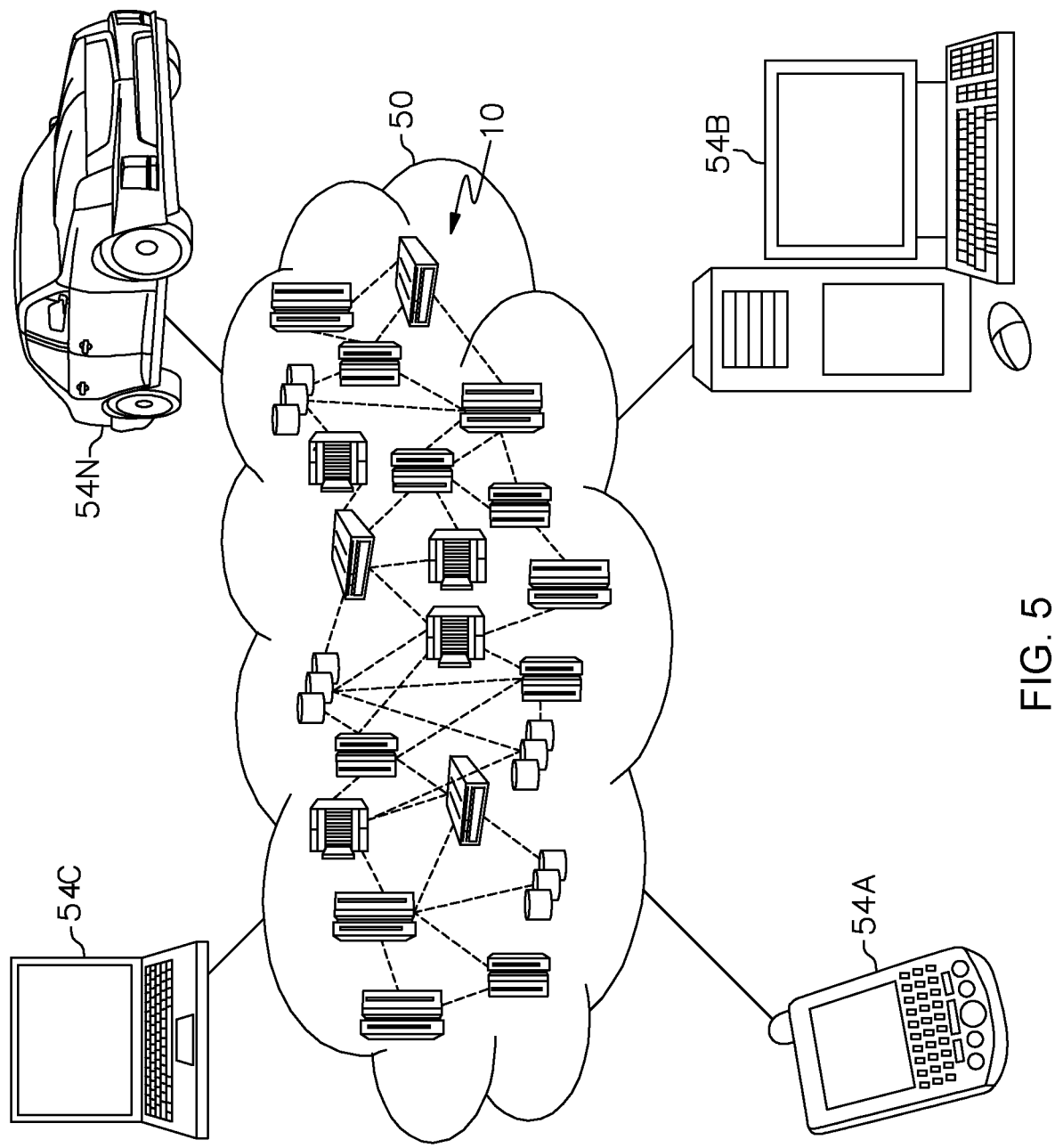
FIG. 5 is a block diagram depicting a cloud computing environment 50 in accordance with at least one embodiment of the present invention.

Server 120 may include components as depicted and described in detail with respect to cloud computing node 10, as described in reference to FIG. 5, in accordance with at least one embodiment of the present invention. Server 120 may include components, as depicted and described in detail with respect to computing device 400 of FIG. 4, in accordance with at least one embodiment of the present invention.

In various embodiments, storage device 130 is a secure data repository for persistently storing vulnerability exclusion records. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

In an embodiment, storage device 130 includes vulnerability exclusion database 132. In an embodiment, vulnerability exclusion database 132 includes information for one or more vulnerability exclusion records. For example, vulnerability prioritization program 101 accesses vulnerability exclusion database 132 to analyze information on previous vulnerability exclusion records in order to generate prioritization scores for previously reviewed exclusion records. In an embodiment, vulnerability exclusion database 132 includes information associated with or more prioritization factors corresponding to previously reviewed exclusion records, such as the exclusion type, system criticality, vulnerability anatomy, remediation sensitivity, network domicile, and past renewal decisions. For example, vulnerability prioritization program 101 accesses vulnerability exclusion database 132 to store information associated with one or more prioritization factors corresponding to previously reviewed exclusion records. In an embodiment, vulnerability exclusion database 132 includes information for prioritization scores associated with previously reviewed exclusion records. For example, vulnerability prioritization program 101 access vulnerability exclusion database 132 to store one or more prioritization scores generated for more or more exclusion records. In an embodiment, vulnerability prioritization program 101 updates vulnerability exclusion database 132 based on newly analyzed prioritization factors and prioritization scores generated for exclusion records.

In an embodiment, vulnerability prioritization program 101 prioritizes exclusion records for renewal review. In an embodiment, vulnerability prioritization program 101 receives the vulnerability exclusion records. In an embodiment, vulnerability prioritization program 101 requests the vulnerability exclusion records, and receives the vulnerability records as system or user input. In an embodiment, the vulnerability exclusion records are uploaded via user device 110. In an embodiment, vulnerability prioritization program 101 receives exclusion records based, at least in part, on a predetermined timeframe. For example, vulnerability prioritization program 101 receives exclusion records as a batch process every week, month, or bi-monthly. In an embodiment, vulnerability prioritization program 101 analyzes exclusion records once a prior review of an exclusion record exceeds a predetermined threshold time period. For example, vulnerability prioritization program 101 analyzes an exclusion record once the most recent exclusion record exceeds 30 days.

In an embodiment, vulnerability prioritization program 101 determines one or more vulnerability factors associated with exclusion records. In an embodiment, vulnerability factors include, but are not limited to, one or more of system criticality associated with an exclusion record, exclusion type associated with an exclusion record, a level of authentication associated with an exclusion record, vulnerability status of an exclusion record, strength of evidence associated with a vulnerability, an amount of time elapsed since a last scan of an exclusion record was performed, a particular network domicile associated with an exclusion record, credentials associated with an exclusion record, an exploit score associated with an exclusion record, an opportune score associated with an exclusion record, an opportune score associated with an exclusion record, and active security information and event management (SIEM) alerts. In an embodiment, vulnerability prioritization program 101 accesses the vulnerability exclusion records to determine the vulnerability factors associated therewith. In an embodiment, vulnerability prioritization program 101 organizes the one or more determined vulnerability factors in a table, as depicted and further explained with reference to FIG. 3.

System criticality refers to identifying what systems and applications are mission or business critical. Mission critical systems are any systems that must continue to run to ensure the core business continues to run. Risk acceptance is often given to vulnerabilities that reside on mission or business critical systems. This stems from the fact that mission and business critical systems are often not maintained as stringently as non-business critical systems because of the lack of systematic backup testing and the uncertainty the system will come back online. In an embodiment, vulnerability prioritization program 101 determines whether a vulnerability level of the system criticality associated with an exclusion record is very high, high, medium, low, or very low. Very high is defined as a mission critical system or application in which the company could not conduct business if it were to go down. High is defined as business critical to where there would be serious damage to name brand recognition and financial loss if the system or application were to go down. Medium is defined as a system or application that would be noticeable if down, but not critical to the business causing financial loss or termination. Low is defined as a system or application that would cause minimal impact to downstream systems and users. Very low is defined as a system or application that would not cause impact if down.

Authentication refers to if a scanner uses credentials to log into a device and performed a scan. Using device authentication allows for the scanner to perform an in-depth assessment and get better visibility into the systems security posture. Running authenticated scans gives you the most accurate results with fewer false positives. Un-authenticated scans primarily examine the device externally and provide limited details of the vulnerability. In an embodiment, vulnerability prioritization program 101 prioritizes excluded records with an authenticated vulnerability for renewal over an un-authenticated scan. For example, a higher score or weight is assigned to exclusion records generated form authenticated scans.

Vulnerability status refers to the state of the vulnerability. An open status means that a vulnerability was detected on the particular device. A closed status means the vulnerability is no longer present. In an embodiment, if an authenticated scan was run, then a closed status indicates that the vulnerability was fixed, otherwise an un-authenticated scan could be inferred that the vulnerability was fixed. In an embodiment, a re-opened status means that a vulnerability status was once reported as closed, but the most recent scan verified it to be opened. In an embodiment, vulnerability prioritization program 101 prioritizes excluded records with an opened or re-opened status for renewal over excluded records with other statuses. For example, a higher score or weight is assigned to exclusion records having a re-opened status.

Vulnerability evidence refers to the results that are produced from a particular scan. Evidence can vary depending on the particular scan check and if the scan was authenticated. For example, an un-authenticated scan might determine application A is outdated by performing a banner grab, whereas an authenticated scan would provide the actual outdated software package version found on the device.

The last scan date refers to the last time a scan was performed on the device and found the particular vulnerability. In an embodiment, vulnerability prioritization program 101 prioritizes excluded records with current last scan dates (i.e., prior scan dates within a predetermined threshold time period) for renewal over older last scan dates (i.e., prior scan dates that exceed a predetermined threshold time period). For example, a higher score or weight is assigned to exclusion records having a last scan date within the predetermined threshold time period.

Exploit score refers to the number of exploits found in the wild for a particular vulnerability. Exploits refer to tools, tactics and procedures found in hacker repositories, frameworks, and other internet outlets. In an embodiment, vulnerability prioritization program 101 prioritizes excluded records with higher exploit scores for renewal over vulnerabilities with lesser scores.

The opportune score refers to a vulnerability that can be exploited without an exploit. An example would be a default password to an application that allows you to have administrative control over a system or environment. In an embodiment, vulnerability prioritization program 101 prioritizes excluded records with a higher opportune score for renewal over vulnerabilities with lesser scores.

The utility score is a qualitative metric from an attacker's perspective regarding actions on objectives. For example, if a penetration tester reports that they were able to access a system and escalate privilege, then the utility score would be a 2. If a penetration tester was able to gain access, but was not able to escalate privilege, then the utility score would be 1. If a penetration tester did not find the vulnerability useful, then the utility score would be a 0. In an embodiment, exclusion records with a higher utility score (i.e., above a predetermined threshold) will be prioritized for renewal over vulnerabilities with lesser scores (i.e., below a predetermined threshold).

The threat actor score is calculated by the number of recognized named threat actors in a framework that are actively using and exploiting the specific vulnerability that maps to the excluded record. In an embodiment, excluded records with a higher threat actor score (i.e., above a predetermined threshold) are prioritized for renewal over vulnerabilities with lesser scores (i.e., below a predetermined threshold).

Active alert score refers to the number of detected alerts (SIEM, endpoint, anti-virus) for the specific host and vulnerability. Alerts that can be mapped to a specific host and vulnerability, provide an additional layer of fidelity, when determining risk urgency. In an embodiment, exclusion records with a higher active alert score (i.e., above a predetermined threshold) will be prioritized for renewal over vulnerabilities with lesser scores (i.e., below a predetermined threshold).

Remediation sensitivity refers to a system that exhibits adverse reactions to activities which include but are not limited to: (i) Business As Usual Maintenance, (ii) Scanning, and (iii) Configuration Changes. Similar to mission and business critical systems, risk acceptance are often given to vulnerabilities that resides on sensitive systems. Typically, there have been documented use cases in which maintenance has been performed on a sensitive system where an adverse result occurred creating significant downtime.

Network domicile refers to the network location of the particular system, which includes but is not limited to external, DMZ, internal or island. In an embodiment, network domiciles are often used as a multiplier in determining risk urgency when analyzing vulnerabilities. External domiciles are internet facing, in which the probability of being attacked by a threat actor are high. DMZ domiciles reside between the external internet and private internal networks. DMZ domiciles expose external-facing services to untrusted networks and adds an extra layer of security to protect the sensitive data stored on internal networks, using firewalls to filter traffic. DMZ domiciles are similar to external domiciles, in where there is a high probability that a threat actor will test externally facing services. Internal domiciles resides in the client's private network and typically have a lower probability of being attacked compare to the external and DMZ domiciles, which also results in a higher number of accepted risks exclusions.

Past renewal decisions refer to the exclusion renewal activities, which include but are limited to: (i) proposing exclusion records for renewal, (ii) identifying the exclusion type, (iii) collecting evidence, if needed, (iv) reviewing evidence, (v) risk assessment, and (vi) approval decision. Machine learning is used to optimize future exclusion renewal prioritizations from past exclusion renewal prioritizations. Machine learning is used to learn from past exclusion renewal decisions to predict the most urgent records to review first. In addition, machine learning is also used provide renewal suggestions. In an embodiment, machine learning is used to decide to whether or not alter (i.e., increase or decrease) the weights assigned to a particular vulnerability factor. In an embodiment, machine learning is used to generating a score for each vulnerability factor associated with a vulnerability exclusion record.

In an embodiment, vulnerability prioritization program 101 generates a vulnerability factor score for each vulnerability factor. In an embodiment, vulnerability prioritization program 101 generates a vulnerability factor score for each vulnerability factor based on the risk of the vulnerability. In an embodiment, the vulnerability factor score for a vulnerability factor associated with the vulnerability exclusion record is further based, at least in part, on, a weighted scoring model associated with the vulnerability factors. For example, a vulnerability factor with a high risk will receive a higher score than a vulnerability factor with a low risk. For example, for the vulnerability factor "exclusion type," vulnerability prioritization program 101 determines the exclusion type is an accepted risk. An accepted risk is more vulnerable than a mitigated risk or a false positive. In this example, vulnerability prioritization program 101 generates a factor score for exclusion type that is higher compared to other exclusions for mitigated or false positive risks.

In an embodiment, vulnerability prioritization program 101 generates a vulnerability score based, at least in part, on one or more vulnerability factors. In an embodiment, the vulnerability score is generated based, at least in part, on one or more vulnerability factor scores. In an embodiment, vulnerability prioritization program 101 weights one or more vulnerability factors more than one or more other vulnerability factors. For example, the vulnerability factor "exploit" is given a higher weight than a than a weight assigned to the vulnerability factor "last scan time" since an exploit is more vulnerable than an exclusion record that has not been reviewed for a certain period of time.

In an embodiment, vulnerability prioritization program 101 generates a vulnerability score by multiplying one or more factor scores corresponding to one or more vulnerability factors associated with an exclusion record. For example, if network location factor score is 3, system criticality factor score is 2, credentialed scans factor score is 1, and vulnerability anatomy factor score is 1, vulnerability prioritization program 101 multiplies the vulnerability factor scores corresponding to these vulnerability factors to generate a vulnerability score of 6. In an embodiment, vulnerability prioritization program 101 generates a vulnerability score by adding one or more vulnerability factor scores corresponding to the previously mentioned vulnerability factors. For example, if network location factor score is 3, system criticality factor score is 2, credentialed scans factor score is 1, and vulnerability anatomy factor score is 1, vulnerability prioritization program 101 adds the vulnerability factor scores to generate a vulnerability score of 7. In an embodiment, vulnerability prioritization program 101 generates a vulnerability score by multiplying and adding one or more factor scores corresponding to one or more vulnerability factors associated with an exclusion record. For example, if network location factor score is 3, system criticality factor score is 2, credentialed scans factor score is 1, and vulnerability anatomy factor score is 1. Here, vulnerability prioritization program 101 adds the vulnerability factor scores to corresponding to credentialed scans factor score (1) and vulnerability anatomy factor score (1) for a first resulting number of 2. Vulnerability prioritization program 101 then multiplies the vulnerability factor scores corresponding to network location factor score (3) and system criticality factor score (2) for a second resulting number of 6. Vulnerability prioritization program 101 then multiplies the first resulting number (2) and second resulting number (6) to generate a vulnerability score of 12.

In an embodiment, the higher the generated vulnerability score, the more urgent the vulnerability is. For example, a vulnerability score of 1000 is more urgent than a vulnerability score of 10. In an embodiment, vulnerability prioritization program 101 ranks the exclusion records based, at least in part, on their vulnerability score. For example, vulnerability prioritization program 101 ranks exclusion vulnerability A with a vulnerability score of 1100 higher than exclusion vulnerability B with a vulnerability score of 300. In an embodiment, vulnerability prioritization program 101 prioritizes review of exclusion records based on their associated vulnerability scores. In an embodiment, vulnerability prioritization program 101 re-reviews or rescans one or more vulnerability exclusion records with vulnerability scores above a predetermined threshold within a predetermined timeframe (e.g., within 24 hours). In an embodiment, vulnerability prioritization program 101 re-reviews or rescans one or more vulnerability exclusion records with vulnerability scores below a predetermined threshold within a later timeframe than vulnerability exclusion records with vulnerability scores above the predetermined threshold. For example, exclusion records with a vulnerability score above 5000 are re-reviewed within 24 hours, while exclusion records with a vulnerability score below 5000 are reviewed between 60 and 90 days from the records most recent review.

In an embodiment, vulnerability prioritization program 101 updates the vulnerability score in the vulnerability exclusion records. In an embodiment, vulnerability prioritization program 101 accesses vulnerability exclusion database 132 and stores the vulnerability score.

According to one embodiment of the present invention, a method for prioritizing exclusion records is disclosed. The method includes: selecting an exclusion record, wherein an exclusion records relates to an excluded vulnerability; calculating, using a machine learning model, a vulnerability score for the exclusion record; and updating the vulnerability score based, at least in part, on one or more vulnerability factors associated with the exclusion record.

The disclosed method for prioritizing exclusion records, wherein the machine learning model predicts the vulnerability score associated with the exclusion record based, at least in part, on the one or more vulnerability factors associated with the exclusion record.

The disclosed method for prioritizing exclusion records, wherein the one or more vulnerability factors are selected from the group consisting of an exclusion type, a system criticality, a vulnerability anatomy, a remediation sensitivity, a network domicile, and previous renewal decisions.

Figure 2:
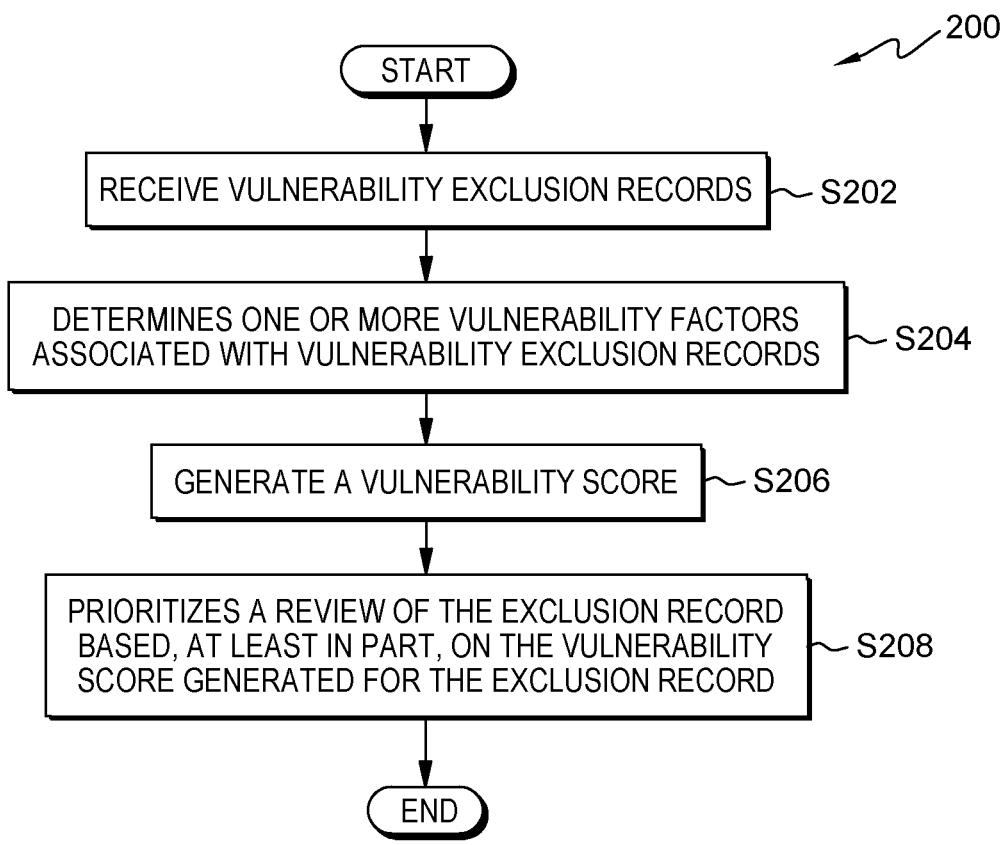
FIG. 2 is a flow chart diagram depicting operational steps for prioritizing vulnerability exclusion records, generally designated 200, in accordance with at least one embodiment of the present invention.

FIG. 2 is a flow chart diagram depicting operational steps for prioritizing vulnerability exclusion records, generally designated 200, in accordance with at least one embodiment of the present invention. Many modifications to the depicted environment may be made by those skilled in the art without departing from the scope of the invention as recited by the claims.

At step S202, vulnerability prioritization program 101 receives vulnerability exclusion records. In an embodiment, vulnerability prioritization program 101 receives vulnerability exclusion records as user input. In an embodiment, vulnerability prioritization program 101 accesses the vulnerability exclusion records from exclusion records database 132. For example, vulnerability prioritization program 101 access vulnerability records that have not been reviewed or scanned within a particular time period since their last scan/review.

At step S204, vulnerability prioritization program 101 determines one or more vulnerability factors associated with vulnerability exclusion records. In an embodiment, vulnerability factors include, but are not limited to, the exclusion type, network location, system criticality, credentialed scans, vulnerability anatomy, vulnerability status, time since last scan, exploit score, SIEM score remediation sensitivity, network domicile, and past renewal decisions. In an embodiment, vulnerability prioritization program 101 accesses vulnerability exclusion records database 132 to determine the vulnerability factors associated with an exclusion record. In an embodiment, vulnerability prioritization program 101 generates one or more vulnerability factor scores for one or more vulnerability factors associated with an exclusion record.

At step S206, vulnerability prioritization program 101 generates a vulnerability score. In an embodiment, vulnerability prioritization program 101 generates a vulnerability score based, at least in part, on one or more vulnerability factor scores associated with an exclusion record.

At step S208, vulnerability prioritization program 101 prioritizes a review of the exclusion record based, at least in part, on the vulnerability score generated for the exclusion record.

Figure 3:
FIG. 3 is a table depicting prioritization factors for generating a prioritization score for a vulnerability exclusion record, generally designated 300, in accordance with at least one embodiment of the present invention.

FIG. 3 is a table depicting prioritization factors for generating a prioritization score for a vulnerability exclusion record, generally designated 300, in accordance with at least one embodiment of the present invention. As depicted, vulnerability exclusion factors associated with an exclusion record include "Exclusion Type" "Network Location" "System Criticality" "Credential Scan" "Vulnerability Status" "Evidence" "Last Scan Time" and "Weaponized Exploit Score" Each vulnerability exclusion factor has one or more detailed factors. For example, "Exclusion Type" indicates "Accepted Risk" "Mitigated Risk" and "False Positive." In an embodiment, the higher the factor score the higher the vulnerability risk. For example, "Exclusion Type" indicates "Accepted Risk" with a factor score of 3, "Mitigated Risk" with a factor score of 2, and "False Positive" with a factor score of 1. Meaning, an accepted risk has a higher vulnerability risk than a false positive.

In an embodiment, vulnerability prioritization program 101 generates a vulnerability score based, at least in part, on one or more vulnerability factor scores. For example, as depicted in FIG. 3, exclusion vulnerability factors associated with the exclusion record are as follows: an accepted risk exclusion type, an external network location, an urgent system criticality, an authenticated credential scan, a re-opened vulnerability status, strong evidence, a current last scan time, a weaponized exploit score, and SIEM active alerts. Here, vulnerability prioritization program 101 multiplies the vulnerability factor scores to corresponding to the respective vulnerability factors for an accepted risk exclusion type (3×), an external network location (3×), an urgent system criticality (4×), an authenticated credential scan (2×), a re-opened vulnerability status (3×), strong evidence (3×), a current last scan time (3×) to generate a number of 1944. Vulnerability prioritization program 101 adds the vulnerability factor scores to corresponding to the respective vulnerability factors for a weaponized exploit score (1248) and active alerts (50) to generate a number of 1298. Vulnerability prioritization program 101 multiplies 1944 and 1248 to generate a vulnerability score of 2,523,312.

FIG. 4 is a block diagram depicting components of a computing device, generally designated 400, suitable for vulnerability prioritization program 101 in accordance with at least one embodiment of the invention. Computing device 400 includes one or more processor(s) 404 (including one or more computer processors), communications fabric 402, memory 406 including, RAM 416 and cache 418, persistent storage 408, which further includes vulnerability prioritization program 101, communications unit 412, I/O interface(s) 414, display 422, and external device(s) 420. It should be appreciated that FIG. 4 provides only an illustration of one embodiment and does not imply any limitations with regard to the environments in which different embodiments may be implemented. Many modifications to the depicted environment may be made.

As depicted, computing device 400 operates over communications fabric 402, which provides communications between computer processor(s) 404, memory 406, persistent storage 408, communications unit 412, and input/output (I/O) interface(s) 414. Communications fabric 402 can be implemented with any architecture suitable for passing data or control information between processor(s) 404 (e.g., microprocessors, communications processors, and network processors), memory 406, external device(s) 420, and any other hardware components within a system. For example, communications fabric 402 can be implemented with one or more buses.

Memory 406 and persistent storage 408 are computer readable storage media. In the depicted embodiment, memory 406 includes random-access memory (RAM) 416 and cache 418. In general, memory 406 can include any suitable volatile or non-volatile one or more computer readable storage media.

Program instructions for vulnerability prioritization program 101 can be stored in persistent storage 408, or more generally, any computer readable storage media, for execution by one or more of the respective computer processor(s) 404 via one or more memories of memory 406. Persistent storage 408 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 can include one or more network interface cards. Communications unit 412 may provide communications through the use of either or both physical and wireless communications links. In the context of some embodiments of the present invention, the source of the various input data may be physically remote to computing device 300 such that the input data may be received, and the output similarly transmitted via communications unit 412.

I/O interface(s) 414 allows for input and output of data with other devices that may operate in conjunction with computing device 400. For example, I/O interface(s) 414 may provide a connection to external device(s) 420, which may be as a keyboard, keypad, a touch screen, or other suitable input devices. External device(s) 420 can also include portable computer readable storage media, for example thumb drives, portable optical or magnetic disks, and memory cards. Software and data used to practice embodiments of the present invention can be stored on such portable computer readable storage media and may be loaded onto persistent storage 408 via I/O interface(s) 414. I/O interface(s) 414 also can similarly connect to display 422. Display 422 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 5 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
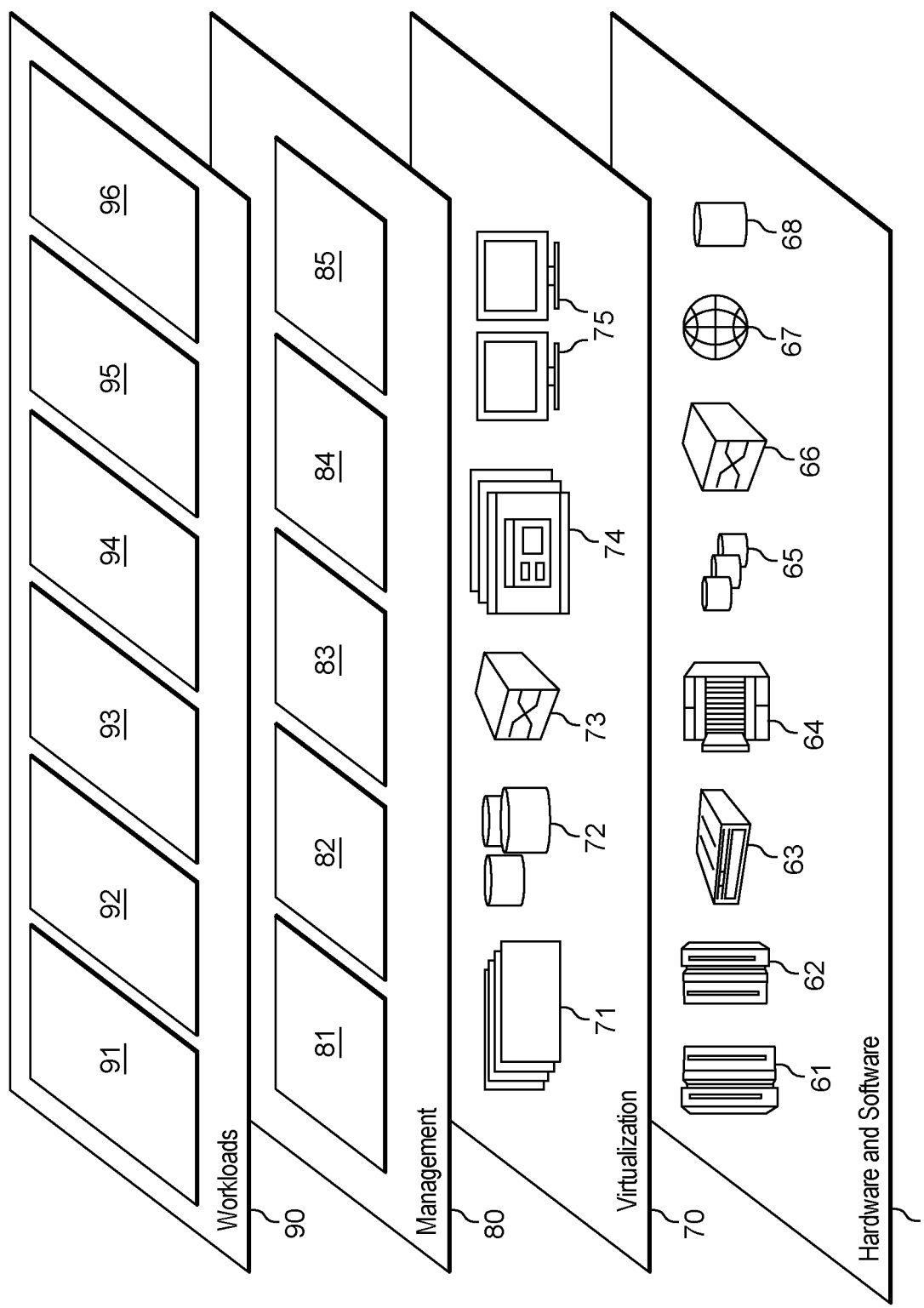
FIG. 6 is block diagram depicting a set of functional abstraction model layers provided by cloud computing environment 50 depicted in FIG. 5 in accordance with at least one embodiment of the present invention.

FIG. 6 is block diagram depicting a set of functional abstraction model layers provided by cloud computing environment 50 depicted in FIG. 5 in accordance with at least one embodiment of the present invention. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vulnerability exclusion 96.

What is claimed is:

1. A computer-implemented method for prioritizing exclusion renewal records, the computer-implemented method comprising:
receiving a vulnerability exclusion record from a vulnerability exclusion database, wherein the vulnerability exclusion record is previously reviewed and includes an exemption from remediation;
determining vulnerability factors associated with the vulnerability exclusion record, wherein the vulnerability exclusion record comprises at least two vulnerability factors;
generating a vulnerability factor score for each vulnerability factor associated with the vulnerability exclusion record based, at least in part, on a level of risk associated with the vulnerability factor;
generating a vulnerability score for the vulnerability exclusion record based, at least in part, on the vulnerability factor score for each vulnerability factor;
updating a previous vulnerability score of the vulnerability exclusion record to the vulnerability score;
ranking, based on the updating, the vulnerability exclusion record with respect to other vulnerability exclusion records based, at least in part, on the vulnerability score; and
prioritizing, based on the ranking, the vulnerability exclusion record for a renewal review of the exemption from remediation.

2. The computer-implemented method of claim 1, wherein generating the vulnerability factor score for a vulnerability factor associated with the vulnerability exclusion record is further based, at least in part, on, a weighted scoring model associated with the vulnerability factors.

3. The computer-implemented method of claim 1, wherein generating the vulnerability score for the vulnerability exclusion record includes:
multiplying each vulnerability score generated for each vulnerability factor with one another.

4. The computer-implemented method of claim 1, further comprising:
re-reviewing the vulnerability exclusion record within a first predetermined timeframe if the vulnerability score of the vulnerability exclusion record is above a predetermined threshold.

5. The computer-implemented method of claim 4, further comprising:
re-reviewing the vulnerability exclusion record within a second predetermined timeframe if the vulnerability score of the vulnerability exclusion record is below the predetermined threshold, wherein the first predetermined timeframe is earlier than the second predetermined timeframe.

6. The computer-implemented method of claim 1, wherein generating the vulnerability factor score for a vulnerability associated with the vulnerability exclusion record is further based, at least in part, on utilizing a machine learning model.

7. The computer-implemented method of claim 1, wherein the vulnerability factors are selected from the group consisting of exclusion type, network location, system criticality, credentialed scans, vulnerability anatomy, vulnerability status, time since last scan, exploit score, SIEM score remediation sensitivity, network domicile, and past renewal decisions.

8. A computer program product for prioritizing exclusion renewal records, the computer program product comprising one or more computer readable storage media and program instructions stored on the one or more computer readable storage media, the program instructions including instructions to:
- receive a vulnerability exclusion record from a vulnerability exclusion database, wherein the vulnerability exclusion record is previously reviewed and includes an exemption from remediation;
- determine vulnerability factors associated with the vulnerability exclusion record, wherein the vulnerability exclusion record comprises at least two vulnerability factors;
- generate a vulnerability factor score for each vulnerability factor associated with the vulnerability exclusion record based, at least in part, on a level of risk associated with the vulnerability factor;
- generate a vulnerability score for the vulnerability exclusion record based, at least in part, on the vulnerability factor score for each vulnerability factor;
- update a previous vulnerability score of the vulnerability exclusion record to the vulnerability score;
- rank, based on the updating, the vulnerability exclusion record with respect to other vulnerability exclusion records based, at least in part, on the vulnerability score; and
- prioritize, based on the ranking, the vulnerability exclusion record for a renewal review of the exemption from remediation.

9. The computer program product of claim 8, wherein the instructions to generate the vulnerability factor score for a vulnerability factor associated with the vulnerability exclusion record is further based, at least in part, on, a weighted scoring model associated with the vulnerability factors.

10. The computer program product of claim 8, wherein the instructions to generate the vulnerability score for the vulnerability exclusion record includes instructions to:
- multiply each vulnerability score generated for each vulnerability factor with one another.

11. The computer program product of claim 8, further comprising instructions to:
- re-review the vulnerability exclusion record within a first predetermined timeframe if the vulnerability score of the vulnerability exclusion record is above a predetermined threshold.

12. The computer program product of claim 11, further comprising instructions to:
- re-review the vulnerability exclusion record within a second predetermined timeframe if the vulnerability score of the vulnerability exclusion record is below the predetermined threshold, wherein the first predetermined timeframe is earlier than the second predetermined timeframe.

13. The computer program product of claim 8, wherein the instructions to generate the vulnerability factor score for a vulnerability associated with the vulnerability exclusion record is further based, at least in part, on instructions to utilize a machine learning model.

14. The computer program product of claim 8, wherein the vulnerability factors are selected from the group consisting of exclusion type, network location, system criticality, credentialed scans, vulnerability anatomy, vulnerability status, time since last scan, exploit score, SIEM score remediation sensitivity, network domicile, and past renewal decisions.

15. A computer system for prioritizing exclusion renewal records, comprising:
- one or more computer processors;
- one or more computer readable storage media;
- computer program instructions;
- the computer program instructions being stored on the one or more computer readable storage media for execution by the one or more computer processors; and
- the computer program instructions including instructions to:
  - receive a vulnerability exclusion record from a vulnerability exclusion database, wherein the vulnerability exclusion record is previously reviewed and includes an exemption from remediation;
  - determine vulnerability factors associated with the vulnerability exclusion record, wherein the vulnerability exclusion record comprises at least two vulnerability factors;
  - generate a vulnerability factor score for each vulnerability factor associated with the vulnerability exclusion record based, at least in part, on a level of risk associated with the vulnerability factor;
  - generate a vulnerability score for the vulnerability exclusion record based, at least in part, on the vulnerability factor score for each vulnerability factor; and
  - update a previous vulnerability score of the vulnerability exclusion record to the vulnerability score;
  - rank, based on the updating, the vulnerability exclusion record with respect to other vulnerability exclusion records based, at least in part, on the vulnerability score; and
  - prioritize, based on the ranking, the vulnerability exclusion record for a renewal review of the exemption from remediation.

16. The computer system of claim 15, wherein the instructions to generate the vulnerability factor score for a vulnerability factor associated with the vulnerability exclusion record is further based, at least in part, on, a weighted scoring model associated with the vulnerability factors.

17. The computer system of claim 15, further comprising instructions to:
- re-review the vulnerability exclusion record within a first predetermined timeframe if the vulnerability score of the vulnerability exclusion record is above a predetermined threshold.

* * * * *